United States Patent
Mourning

(10) Patent No.: US 10,121,266 B2
(45) Date of Patent: Nov. 6, 2018

(54) MITIGATION OF DISOCCLUSION ARTIFACTS

(71) Applicant: Affine Technologies LLC, Middleport, OH (US)

(72) Inventor: Chad Mourning, Middleport, OH (US)

(73) Assignee: AFFINE TECHNOLOGIES LLC, Middleport, OH (US)

( * ) Notice: Subject to any disclaimer, the term of this patent is extended or adjusted under 35 U.S.C. 154(b) by 238 days.

(21) Appl. No.: 14/951,041

(22) Filed: Nov. 24, 2015

(65) Prior Publication Data

US 2016/0148397 A1    May 26, 2016

Related U.S. Application Data

(60) Provisional application No. 62/084,242, filed on Nov. 25, 2014.

(51) Int. Cl.
*G06T 11/00* (2006.01)
*G06T 15/04* (2011.01)
*G06T 15/20* (2011.01)

(52) U.S. Cl.
CPC ............ *G06T 11/001* (2013.01); *G06T 15/04* (2013.01); *G06T 15/20* (2013.01); *G06T 2210/36* (2013.01)

(58) Field of Classification Search
CPC .............................. G06T 11/001; G06T 15/04
See application file for complete search history.

(56) References Cited

U.S. PATENT DOCUMENTS

| | | | | |
|---|---|---|---|---|
| 5,805,782 A * | 9/1998 | Foran | ...................... | G06T 15/50 345/426 |
| 5,883,631 A * | 3/1999 | Konno | ..................... | G06T 17/30 345/423 |
| 6,525,731 B1 * | 2/2003 | Suits | ....................... | G06T 15/04 345/421 |
| 2006/0028466 A1 * | 2/2006 | Zhou | ....................... | G06T 17/20 345/420 |
| 2011/0306417 A1 * | 12/2011 | Sheblak | .................. | A63F 13/10 463/32 |
| 2014/0132715 A1 * | 5/2014 | Raghoebardayal | ..... | G06T 17/00 348/43 |
| 2014/0198182 A1 * | 7/2014 | Ward | ................. | H04N 13/0011 348/43 |

OTHER PUBLICATIONS

An Analysis of Impostor Based Level of Detail. Approximations for LIDAR Data. Mourning et al, Sep. 28, 2011, ISVC 2011, Part II, LNCS 6939, pp. 637-646.*

(Continued)

*Primary Examiner* — Jitesh Patel
(74) *Attorney, Agent, or Firm* — Pearne & Gordon LLP

(57) ABSTRACT

Image based imposters suffer from common errors called disocclusion artifacts where portions of the scene that should be occluded by real geometry are visible when using image based imposters. These artifacts are the result of parallax error created by camera motion where regions of a mesh that were not visible at the time of imposter generation have become visible. A computationally inexpensive on-line technique to resolve these disocclusions stretches existing imposter texture information over new geometry bridging the gap between imposters.

16 Claims, 6 Drawing Sheets

(56) References Cited

OTHER PUBLICATIONS

Efficient Impostor Manipulation for Real-Time Visualization of Urban Scenery. Sillion et al. Eurographics '97, Blackwell Publiers, vol. 16, (1997).*
Thrun, Sebastian, et al. "Stanley: The robot that won the DARPA Grand Challenge." The 2005 DARPA Grand Challenge. Springer Berlin Heidelberg, 2007. 1-41.
Popescu, Voicu, and Daniel Aliaga. "The Depth Discontinuity Occlusion Camera." 1-5.
Mo, Q., Popescu, V., Wyman, C., & University of Iowa, U. P. (2007). The Soft Shadow Occlusion Camera. 1-25.
Rosen, Paul, and Voicu Popescu. "The epipolar occlusion camera." Proceedings of the 2008 symposium on Interactive 3D graphics and games. ACM, 2008.
Ye, Jinwei, and Jingyi Yu. "Ray geometry in non-pinhole cameras: a survey." The Visual Computer 30.1 (2014): 93-112.
Mourning, Chad, Scott Nykl, and David Chelberg. "An analysis of impostor based level of detail approximations for LIDAR data." Advances in Visual Computing. Springer Berlin Heidelberg, 2011. 637-646.
Ballard, Dana H. "Strip trees: a hierarchical representation for curves." Communications of the ACM 24.5 (1981): 310-321.
Mourning, Chad, et al. "An overview of first generation STEAMiE learning objects." World Conference on Educational Multimedia, Hypermedia and Telecommunications. vol. 2009. No. 1. 2009.
Pedersen, Marius, and Jon Yngve Hardeberg. "A New Spatial Hue Angle Metric for Perceptual Image Difference." Computational Color Imaging. Springer-Verlag, 2009.
McKinion, J. M., J. L. Willers, and J. N. Jenkins. "Spatial analyses to evaluate multi-crop yield stability for a field." Computers and Electronics in Agriculture 70.1 (2010): 187-198.
Milford, John. "Mapping Ancient Civilization, in a Matter of Days." New York Times. May 10, 2010. http://www.nytimes.com/2010/05/11/science/11maya.html.
Zhang, Liang, and Wa James Tam. "Stereoscopic image generation based on depth images for 3D TV." Broadcasting, IEEE Transactions on 51.2 (2005): 191-199.
Hasager, C. B., Peña, A., Mikkelsen, T., Courtney, M. S., Antoniou, I., Gryning, S. E., . . . & Sørensen, P. B. (2007). 12MW Horns Rev Experiment. Risø National Laboratory.
Maciel, Paulo William Cardoso. Visual Navigation of Large Environments Using Textured Clusters. Diss. Indiana University, 1995.
Hong, Guowei, and Ming R. Luo. "Perceptually-based color difference for complex images." 9th Congress of the International Color Association. International Society for Optics and Photonics, 2002.
Haar, Alfred. "Zur theorie der orthogonalen funktionensysteme." Mathematische Annalen 69.3 (1910): 331-371.
Shade, Jonathan, et al. "Layered depth images." Proceedings of the 25th annual conference on Computer graphics and interactive techniques. ACM, 1998.
Jeschke, Stefan, and Michael Wimmer. "Textured depth meshes for real-time rendering of arbitrary scenes." Rendering Techniques. 2002.
Mei, Chunhui, Voicu Popescu, and Elisha Sacks. "The occlusion camera." Computer Graphics Forum. vol. 24. No. 3. Blackwell Publishing, Inc, 2005.
Aliaga, D., Cohen, J., Wilson, A., Baker, E., Zhang, H., Erikson, C., . . . & Whitton, M. (Apr. 1999). MMR: An interactive massive model rendering system using geometric and image-based acceleration. In Proceedings of the 1999 symposium on Interactive 3D graphics (pp. 199-206). ACM.
Kawasaki, Shuntaro Yamazaki Ryusuke Sagawa Hiroshi, and Katsushi Ikeuchi Masao Sakauchi. "Microfacet billboarding." 13th Eurographics Workshop on Rendering: Pisa, Italy, Jun. 26-28, 2002. Association for Computing Machinery, 2002.
Bertalmio, Marcelo, et al. "Image Inpainting." 1-12.

* cited by examiner

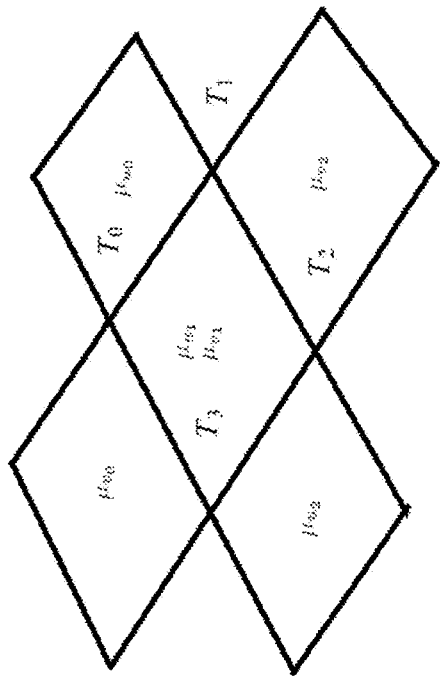
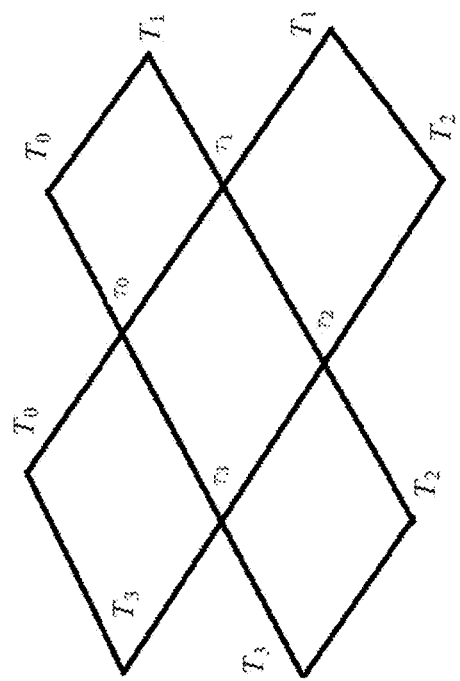
Figure 6A
Figure 6B
Figure 6c

MITIGATION OF DISOCCLUSION ARTIFACTS

CROSS REFERENCE TO RELATED APPLICATIONS

This application claims priority to U.S. Provisional Application Ser. No. 62/084,242, filed on Nov. 25, 2014, entitled "MITIGATION OF DISOCCLUSION ARTIFACTS", the entirety of which is incorporated herein by reference.

BACKGROUND

Graphics cards are consistently improving in speed and performance, but they are being outpaced by the growth of big data and, in particular, the output of remote sensing technologies. For example, point clouds returned by technologies like Light Detection and Ranging (LiDAR) are becoming increasingly important in diverse fields such as robotics, agriculture, archaeology, renewable energy, and the like where data has a spatial component. This gap requires new techniques to relax computational requirements while providing a sufficiently useful output.

Current image based level-of-detail techniques attempt to solve the above problem, however, these techniques suffer from a number of deficiencies. One such technique, image based imposters, represents an impersonated object by a textured quadrilateral positioned such that the projection of the 3D geometry onto a 2D surface produces an identical result. The fundamental failures in this technique are errors created when the camera position moves from where the imposter was originally generated. Because these errors show regions of space that should have otherwise been occluded, they are often referred to as disocclusion artifacts. FIGS. 1 and 2 illustrate an example of these disocclusions. FIG. 1 shows full fidelity data from an original camera position, while FIG. 2 illustrates imposters with disocclusions 200 resulting from a changed camera position.

Layered depth images (LDIs) attempt to reduce these parallax errors by generating a texture that stores multiple depth values per texel. As the camera moves, an incremental warping function determines which depth layer will be exposed for a given pixel. However, this technique is especially prone to sampling artifacts. While this may not be a major issue for some polygonal models, missing even a single pixel for point clouds can drastically alter data. Additionally, this technique is intended to be computed offline and, therefore, cannot handle modifications made to the data during runtime.

Unlike standard imposters which use a single quadrilateral, textured depth meshes (TDMs) create a new polygonal mesh, of many fewer faces, through a voxel based sampling scheme from a particular viewpoint. However, similar to LDIs, the generation step is very slow and must be performed offline. TDMs also have a very high spatial requirement for situations where the camera position is not severely restricted.

More recently, occlusion cameras have become popular. Unlike a planar pinhole camera model, the occlusion camera model uses curved rays to inspect beyond the edges of objects, so that slightly occluded fragments are known in advance. This technique also has a few drawbacks that make it unsuitable for point clouds: first, it does not work well with data including large, sudden changes in depth information; and second, the resolution of the output image is reduced because of the multiple samples along each ray. Additionally, in the general case, it cannot guarantee that all disocclusions are resolved, especially for large movements of the camera. In light of these issues, planar pinhole camera models are also not suitable for runtime modifications of point cloud data.

BRIEF SUMMARY

According to one example described herein, a method for generating images includes: forming a bridge between a sequence of a plurality of points, each consecutive pair of the sequence of points being points along an interface between two adjacent sub-meshes replaced by image-based imposters, wherein the plurality of points have the same screen space position and different world space positions when projected into the plane of the imposter; generating content of textures to be mapped onto the image-based imposters; and computing texture coordinates for a generation position and a second camera position.

In various embodiments of the above example, the step of forming a bridge includes: constructing an artificial interface of world space points along the natural interface between the two adjacent sub-meshes; projecting the world space points into screen space positions; reassigning the screen space positions depth coordinates of two destination imposter planes; and transforming the screen space positions back into world space; the step of forming a bridge includes constructing an artificial interface of world space points along the interface between the two adjacent sub-meshes, the artificial interface of world space points being constructed using a strip tree; the step of forming a bridge includes constructing an artificial interface of world space points along the interface between the two adjacent sub-meshes, the artificial interface of world space points being constructed using a Bézier curve; the step of forming a bridge includes constructing an artificial interface of world space points along the interface between the two adjacent sub-meshes, the artificial interface of world space points being constructed using a basis spline; the step of computing texture coordinates for a second camera position includes: stretching the texture over the imposter, wherein the texture is stretched based on a weighted metric such that as bridge segments of the imposter becomes visible the stretching of the texture increases; the method is applied to a point cloud split into a plurality of meshes; the two points are stored in memory and the method is executed by a processor; the method further includes displaying the generated image on a monitor; and/or the image is generated in real-time based on a dataset, as the dataset is being modified.

According to another example described herein, an apparatus for generating an image includes: a bridge forming section configured to form a bridge between a sequence of a plurality of points, each consecutive pair of the sequence of points being points along an interface between two adjacent sub-meshes replaced by image-based imposters, wherein the plurality of points have the same screen space position and different world space positions when projected into the plane of the imposter; a texture generating section configured to generate textures to be mapped onto the image-based imposters; and a texture computing section configured to compute texture coordinates for a generation position and a second camera position.

In various embodiments of the above example, the bridge forming section is further configured to: construct an artificial interface of world space points along the natural interface between the two adjacent sub-meshes; project the world space points into screen space positions; reassign the screen space positions depth coordinates of two destination imposter planes; and transform the screen space positions back into world space; the bridge forming section is further configured to construct an artificial interface of world space points along the interface between the two adjacent sub-meshes, the artificial interface of world space points being constructed using a strip tree; the bridge forming section is further configured to construct an artificial interface of world space points along the interface between the two adjacent sub-meshes, the artificial interface of world space points being constructed using a Bézier curve; the bridge forming section is further configured to construct an artificial interface of world space points along the interface between the two adjacent sub-meshes, the artificial interface of world space points being constructed using a basis spline; for the second camera position, the texture computing section is further configured to: stretch the texture over the imposter, wherein the texture is stretched based on a weighted metric such that as bridge segments of the imposter becomes visible the stretching of the texture increases; the apparatus further includes a display for displaying the generated image; and/or the image is generated in real-time based on a dataset, as the dataset is being modified.

BRIEF DESCRIPTION OF THE DRAWINGS

FIGS. 6A, 6B, and 6C illustrate texture coordinates in one and two dimensions according to an embodiment of the present disclosure.

DETAILED DESCRIPTION

Figure 1:
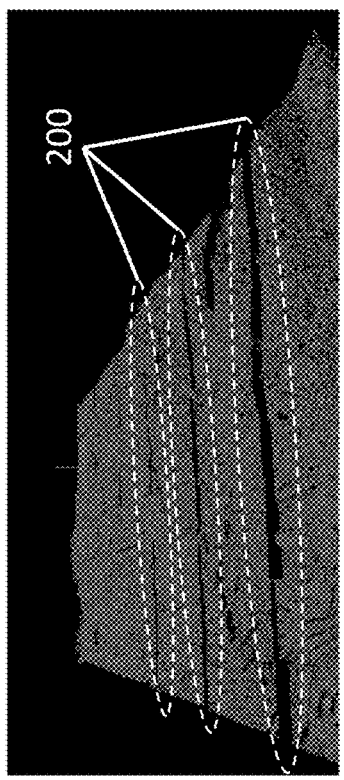
FIG. 1 illustrates an image with full fidelity data from an original camera position.
Figure 2:
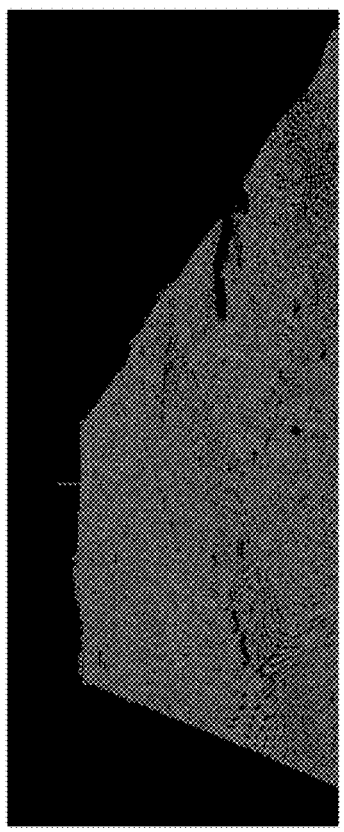
FIG. 2 illustrates imposters with disocclusions resulting from a different camera position than shown in FIG. 1.

The present disclosure introduces an image based level-of-detail technique that resolves disocclusions and is suitable for point cloud data updated in an online manner during runtime. The technique also provides an analysis of the output images based on a variety of modern image quality metrics. While the technique described herein is explained with respect to point cloud data (e.g., datasets with gradual z-axis deviations such as outdoor terrain scenes) it is to be understood that the technique is also envisioned to be adapted to constrain error for more erratic scenes and other sets of data, irrespective of content. An example implementation presented herein operates on a point cloud which has already been split into equal sized meshes to assist with frustum culling. To simplify the update scheme, 60 meshes were used (laid out in a 12×5 grid to approximate the extents of the cloud), so all meshes would be updated in one second if one mesh was updated per frame, on a vertically synced 60 Hz display.

In a first aspect of the technique presented herein, a new geometry is used to cover disocclusions. In a second aspect, the content of a texture is mapped to the new surface geometry. In a third aspect, the texture coordinates used on the new and existing geometry are addressed.

With respect to the first aspect directed to a new geometry used to cover disocclusions, a bridge is built at the screen space interface between two sub-meshes to cover the disocclusions between the world space positions. For example, when two adjacent sub-meshes are replaced by image-based imposters, the points along the interface between the mesh lie in both imposters at the same screen space position; however, these points have two different world space positions when projected into the plane of the imposter. The bridge is formed between these twin world space points. This new geometry effectively solves the disocclusion by filling in all gaps, but the content of these new fragments does not necessarily match the content of the impersonated scene. However, such a sacrifice in fidelity can increase interactivity and is consistent with the philosophy behind level-of-detail techniques.

While the geometry of ideal image imposters is a single quadrilateral, the geometry of the new imposters is designed to form a continuous surface over the entire on-screen area covered by the original set of meshes. This surface can be broken down into a collection of tri-sectioned imposters (in one direction), with a section forming the main imposter face, and two sections representing half of the bridges between meshes. In order to capture the relevant portion of the screen space area, a strip tree of world space points may be constructed along the interface between the two meshes. In other embodiments, a Bézier curve, basis spline, or other curve could be used instead of or in addition to a strip tree to construct an artificial interface between the two meshes; however, the use of a strip tree is described herein for illustrative purposes. The world space points are then projected into their screen space positions. These screen space positions are reassigned the depth coordinates of the two destination imposter planes and then transformed back into world space. These bridges, between the world space twins of the interface between meshes, fully cover the disocclusion region caused by parallax motion of the camera.

Figure 4:
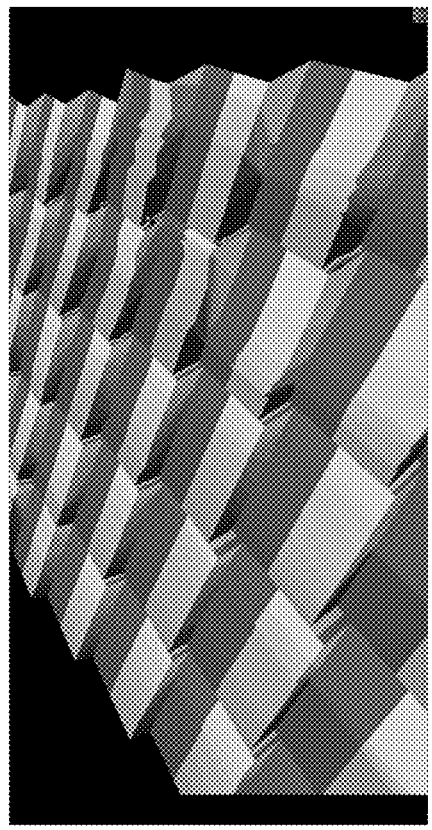
FIG. 4 illustrates disocclusions solved with an embodiment of the present disclosure.
Figure 3:
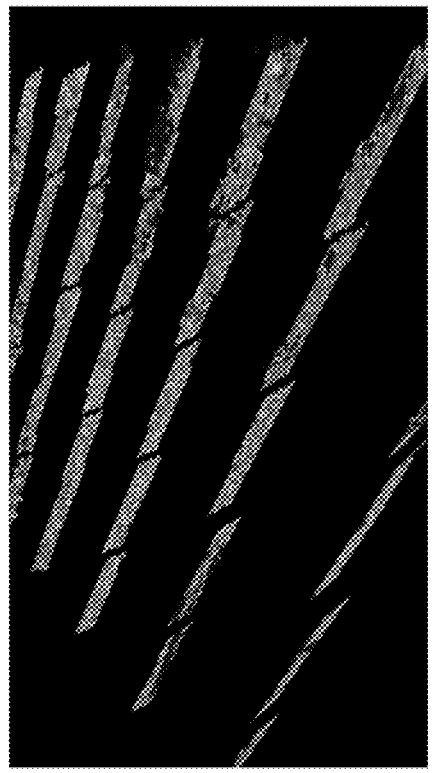
FIG. 3 illustrates ideal imposters with parallax error.
Figure 5:
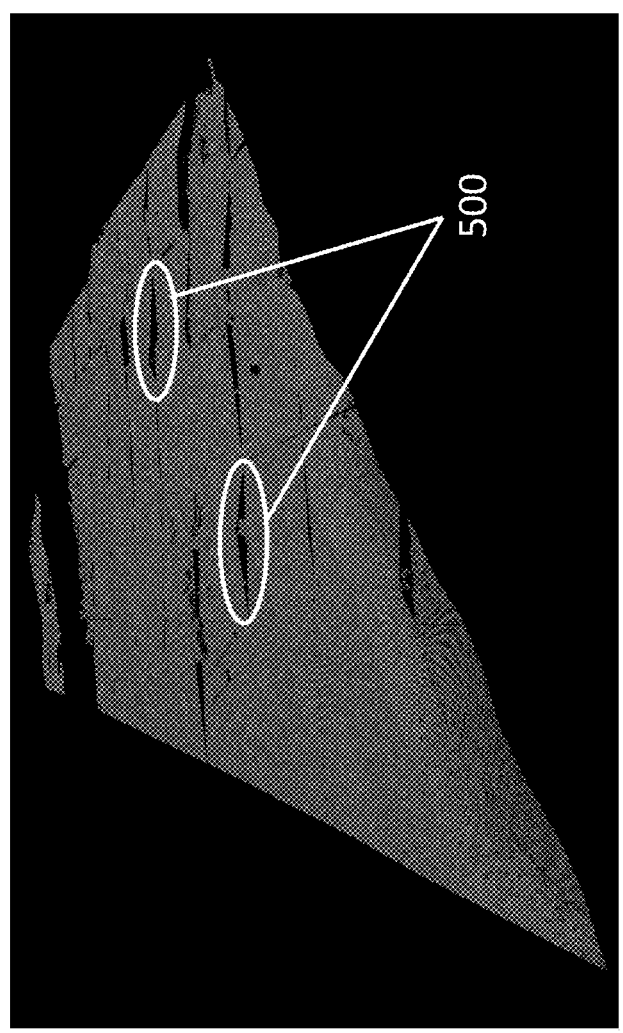
FIG. 5 illustrates imposters with a single segment strip tree and the gaps created in the texture.

FIGS. 3 and 4 illustrate an example of this new geometry with extreme camera motion, to highlight the creation of the disocclusions in both directions. FIG. 3 shows ideal imposters with parallax error and FIG. 4 illustrates disocclusions solved with the new geometry. The shaded sections of FIG. 4 represent the connections between each segment of a strip tree, as discussed in more detail below. FIG. 5 illustrates a possible desire for a complex interface by showing the imposters with a single segment strip tree (straight line) and the gaps created in the texture. While two examples of disocclusions 500 are noted, several others are present.

The main face of the imposter is no longer a single quadrilateral, but rather a collection of quadrilaterals connecting the two strip trees. For simplicity, all strip trees in the example implementation herein used the same fidelity, however, the fidelity can be adjusted per-mesh based on deviations in the height of the interface. Similarly, the fidelity of the strip tree can be changed based on the polygon budget of the scene. It is also noted that the texture on the imposter is not tied to the strip tree fidelity. Thus, the strip tree geometry can be changed without requiring regeneration of the texture. Because strip tree construction can be done in O(n) time for already sorted points (e.g., the content of a previous strip tree), this step can be done as part of online algorithm during runtime.

With respect to the second aspect of the technique described, the content of textures mapped onto the imposter is generated by calculating the axis aligned screen space size of the mesh and using a frame buffer object with a render buffer of identical size. This creates a one-to-one mapping between pixels in the original mesh rendering and pixels in the imposter when applied to a quadrilateral positioned such that its screen space size is also identical. As discussed in more detail below, this can lead to pixelation as the camera draws closer to the imposter once the one-to-one mapping no longer holds, until the texture is regenerated. If sufficient graphics memory is available, larger than necessary textures could be used to mitigate such pixelation.

With respect to the third aspect of the technique described herein, two sets of texture coordinates are computed. The first set of texture coordinates is for the generation position, and a second set of texture coordinates accounts for a camera motion. Since the axis aligned screen space extents were already calculated to determine the size of the frame buffer object's render buffer, and the screen space positions of the strip tree geometry were already calculated to create the bridge end points, the texture coordinates at the generation position may be computed. A screen space point at the lower left extent (which may or may not exist) would have a (u,v) coordinate of (0,0) and a screen space point at the upper right would have a (u,v) coordinate of (1,1); points in between are assigned coordinates proportionately.

Mapping the texture to the new geometry includes stretching the ideal imposter texture over the main imposter face and bridge segments. A metric can be created to determine how much a texture should be stretched over these surfaces by weighting the bridge segments. At the generation position, the imposter method presented herein can look identical, or nearly identical, to classic imposters. Because the bridge connects identical screen space points at the generation position, the on screen size of the bridge segments at the generation position can be considered zero and, therefore, no stretching is required. As the camera moves and the bridge segments become visible, the weight given to the bridge segments increases, and the texture stretches over the geometry.

Thus far, the above discussion has only covered stretching the textures in one direction. However, texture stretching in two directions is also possible. The same screen space size metric, as discussed above, can be used for texture weights ($\mu$). However, these weights are used to stretch the texture in two, typically oblique, directions. An approximation is used based on an oblique projection of the texture coordinates into a coordinate frame using the difference in texture coordinates of the corners as basis vectors (U and V). Since the opposing edges of the main face should be roughly parallel, the same basis vectors can be used for all four corners to reduce computation. However, if desired for a particular application, recalculating for each corner may yield some improvements. Equations 1 and 2 provide an example of how to calculate the coordinates in this new frame, $u_i$ and $v_i$, given starting texture coordinates $T_i$ and the oblique basis vectors. It should be noted that the example given in equations 1 and 2 only represent one of many possible ways of stretching the texture and, therefore, should not be viewed as a limiting embodiment. The new texture coordinates $\tau_i$, as shown in FIGS. 6A-6C for one and two directions, are computed as a weighted bilinear interpolation using the oblique coordinates, $u_i$ and $v_i$, as well as the texture stretching weights $\mu_j$; with i from [0 . . . 3] and j from [0 . . . 2]. In two directions there are separate texture weights in the U and V directions.

$$u_i = \frac{U \cdot T_i - (U \cdot V * V \cdot T_i)}{1 - (U \cdot V)^2} \quad (1)$$

$$v_i = \frac{V \cdot T_i - (V \cdot U * U \cdot T_i)}{1 - (U \cdot V)^2} \quad (2)$$

The calculation of the new texture coordinates shown in FIGS. 6A-6C can be simplified if the imposter face contained strictly relevant texture information and, therefore, had texture coordinates in the range (0,0) . . . (1,1), or if the U and V were orthogonal. If there is any deviation in the interface between meshes, then the texture can contain some content unsuitable for stretching, and a more complicated set of equations, such as those above, may be used.

A series of experiments analyzed the quality of the technique described herein as compared to two competing techniques: decimation, the most common form of level-of-detail for point cloud rendering, and classic imposters. The point cloud used for the experiment contained 12,212,086 points, and was divided into 60 equal sized meshes. One imposter was updated per frame in a hybrid screen-space/least recently used method. For these tests a constant sized strip tree was used. However, it should be noted that other possible strip tree methodologies may be used, as described below. The testing platform for the initial timing tests was a laptop with an NVidia 280M graphics card, a 2.67 GHz Intel Core i7 processor, with 6 GB of RAM.

In order to create a valid comparison, a decimation rate of 30:1 was selected in order to match the frame rate of the imposter techniques on the timing test platform. Error was calculated as a series of image comparison metrics between the full fidelity set and the three test techniques. A predetermined flight path containing 900 frames was generated using each technique and these frames were used in the image comparison metrics described below.

The simplest metric tested was a pixel-by-pixel root mean square error difference in luminosity. A very similar approach converts the pixels into the perceptually uniform CIELAB space and calculates the error based on the Euclidian distance between the like indexed pixels in each image. In an attempt to better capture features humans find desirable, the hue angle metric creates a color histogram and weights pixels belonging to the more common colors more heavily. This is to simulate large patches of the same colors which are probably more important to the user. The Spatial Hue Angle Metric (SHAMe) improves upon the hue angle metric to better model the human visual system by passing the input images through a spatial filter in order to ignore very high frequency noise that human users would likely ignore. This is effectively a low pass filter based on a contrast sensitivity function operating on the frequency space representation of the image.

The latter two metrics are asymmetric—that is, running the metric, M, on images $I_1$ and $I_2$, will give a different result than running M on $I_2$ and $I_1$. During analysis, these metrics are used twice: once as a measure of how different the modified image is from the original and once as a measure of how different the images are from each other, derived from the mean of running the metric in either direction.

The final metric is based on the Haar wavelet. In this metric, half of the weight of the output value is given to the average of the entire image, a quarter of the weight is given to average of image quarters, an eighth of the weight is given to the average of the image sixteenths, etc. This makes the metric very robust to slight movement and roundoff errors in the positions of the imposter texels.

Figure 7A:
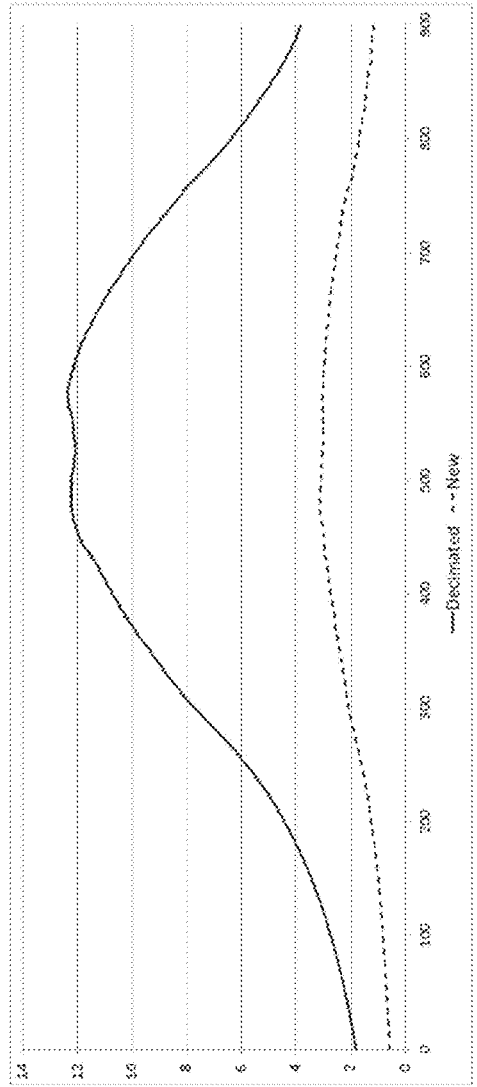
FIGS. 7A and 7B illustrate example of errors for the Haar Wavelet metric for classic and decimated level-of-detail techniques compared to the technique described herein.
Figure 7B:
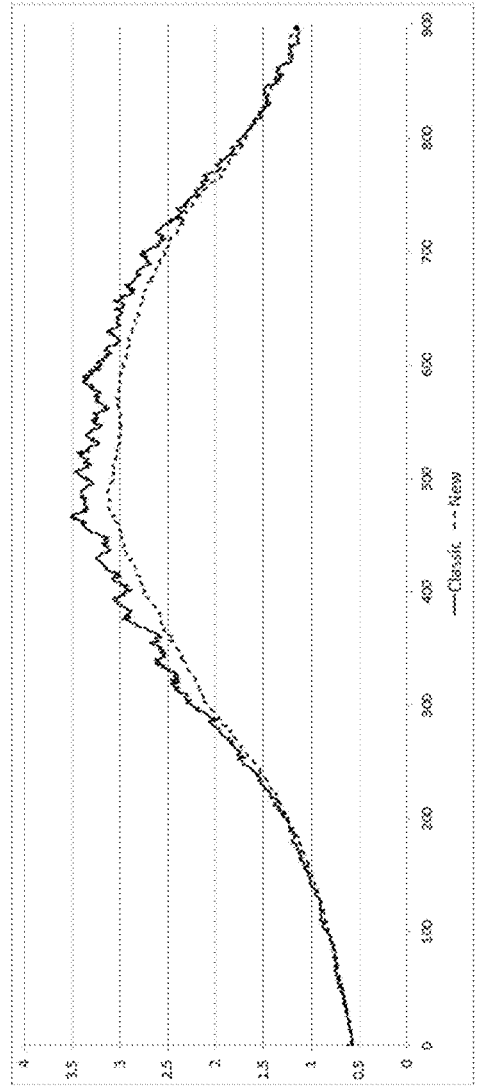

Tests were run at three different resolutions, including two different aspect ratios: 800×600, 1024×768, and 1280×720. Results were comparable, so only the results for 1024×768 are given here. Table 1 contains the absolute error values for all metrics and rendering styles at this resolution, as well as the relative error percentages for the two imposter techniques. FIGS. 7A and 7B show an example of errors for the Haar Wavelet metric for all three level-of-detail techniques (classic, new, and decimated) for the 1024×768 resolution images. The horizontal axis of FIGS. 7A and 7B indicates a frame number and the vertical axis is the absolute error.

| Metric | Decimation | Classic | New | Relative |
|---|---|---|---|---|
| RMS | 3.1015 | 1.1829 | 1.1323 | 95.724 |
| Haar | 3.0017 | 0.8324 | 0.7819 | 93.935 |
| Δ * E | 1.8937 | 0.9657 | 0.9443 | 97.782 |
| Hue Angle One-way | 0.9831 | 0.4937 | 0.4822 | 97.681 |
| Hue Angle Two-way | 1.0583 | 0.4961 | 0.4837 | 97.491 |
| Spatial Hue Angle | 1.1755 | 0.3777 | 0.3616 | 95.732 |

For the six metrics used, the imposters using the disclosed disocclusion mitigation technique outperform the classic imposter and decimated approaches. The Haar Wavelet metric has the largest separation in normalized values of any of the metrics, implying that this metric might be a good choice for evaluating image similarity problems. Tests were run with multiple resolutions and results were comparable for all resolutions. Even though the difference in error between approaches was quantitatively small, the results may be much more pleasing to users.

Another characteristic indicated by the graphs in FIGS. 7A and 7B is that, according to at least the Haar metric, in addition to being smaller, the error appears to be smoother than the classic imposter. This quality should provide a more pleasing experience to a user.

There are several sources of error that may cause the error metric values to inflate and diverge from actual human perception. The first likely results from older hardware and is caused by a difference in depth buffer precision between the main render buffer and frame buffer objects. A source of error that is common to many image-based rendering techniques that rely on a static image, for some period of time, is pixelation when the number of pixels on screen surpasses the number of pixels in the image. This can be ameliorated by using a larger than necessary render buffer when generating the image. However, this requires more texture memory, and likely more rendering time when generating.

Complete coverage of the disocclusion would require a high fidelity strip tree; however, for these experiments all strip trees used a constant size (10 segments). This number of segments is quite generous for most of the segments in the given terrain set, but for a sufficiently erratic interface, gaps may still be present.

The screen space texture weighting metric can also introduce occasional errors when very long screen space bridge segments that should have had zero area have their minor axis dimension rounded to 1 pixel. This can usually be avoided heuristically. However, this problem is exacerbated when meshes become larger on screen, and is the primary cause for the increase in relative error towards the end of the flight path in FIG. 7.

It should be noted that there are many variations of the above envisioned to be within the scope of the present disclosure. For example, it may be desirable to include a dynamic use of the strip trees. That is, it may be possible to use more segments for more erratic interfaces or dynamically adjust strip tree fidelity based on polygon budgets to maintain a specific frame rate. Dynamic placement of the connective geometry between two meshes or, more creatively, creating one large surface with texture control points, for all the meshes is also envisioned.

It is additionally noted that any of the aspects, or combination of aspects, described above may be implemented via hardware or software. For example, these aspects may be implemented on a processor or a plurality of processors, such as a graphics processing unit (GPU) or similar dedicated graphics processor. These processors also may be embedded or integrated with other processors designed for a separate purpose, for example, as part of a central processing unit (CPU). A "processor" as used herein refers to any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like. The processor may also stand alone or be part of a computer used for operations other than processing image data. Implementation of these aspects may by hardware or software may be realized in any number of electronic devices and/or applications, including but not limited to, personal computers, servers, mobile phones, and the like. Moreover, the above aspects and/or combination of aspects may be stored in memory which is executable by one of said processors. It should be noted that the above description is non-limiting, and the examples are but only a few of many possible processors and implementations envisioned.

It should also be noted that the above aspects are intended to be implemented for providing a display to a user. The end display may be visible to the user, for example, for viewing the above-discussed point cloud data. Such displays may include monitors or screens, including but not limited to, liquid crystal displays (LCDs), light emitting diode displays (LEDs), cathode ray tube displays (CRTs), plasma displays, and the like. In light of this, it is also understood that the display is connected to and at least partially driven by the above noted hardware and/or software, for example, GPU or CPU. That is, for example, a computer for displaying point cloud data may include a motherboard having a CPU, a graphics card having a GPU, and a monitor. The monitor may be connected to the graphics card having a GPU, the graphics card being further connected to the motherboard having a CPU. In this way, the CPU may operate on the point cloud data and, in conjunction with the GPU, provide a display output via the graphics card to the monitor for displaying the point cloud data to a user in accordance with the above aspects or combination of aspects of the present disclosure.

Figure 8:
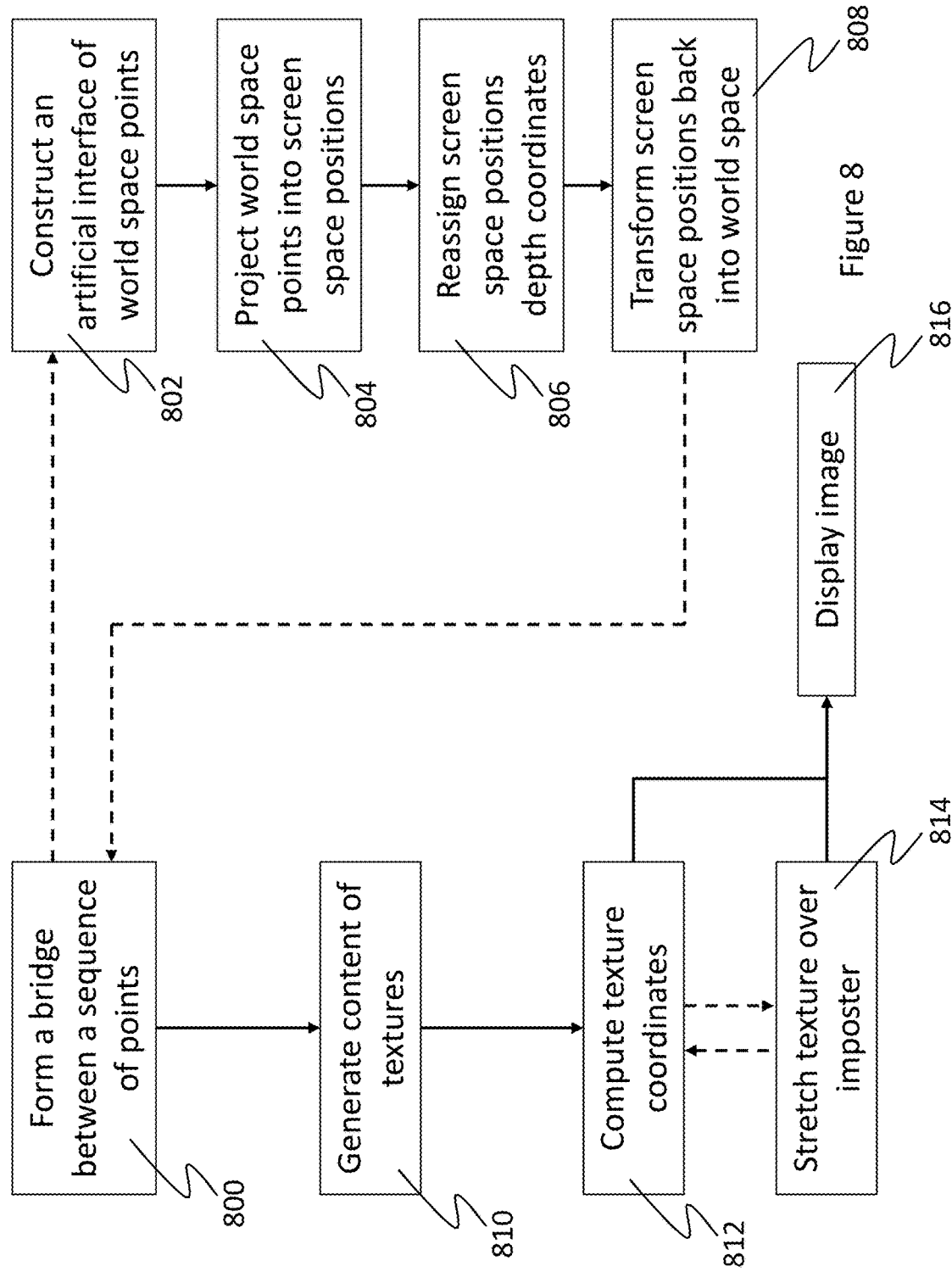
FIG. 8 illustrates a flow chart indicating a method to generate an image from point cloud data.

For example, FIG. 8 illustrates a flow chart indicating a method for implementing the above described aspects, for example, to generate an image from point cloud data. In a first step 800, a bridge is formed between a sequence of points, as described with respect to the first aspect. One optional approach for forming the bridge, as described above, may involve constructing an artificial interface of world space points 802, projecting the world space points into screen space positions 804, reassigning the screen space positions depth coordinates 806, and transforming the screen space positions back into world space 808. According to the second aspect, textures are generated and mapped to the new surface geometry 810. Then, as described with respect to the third aspect, texture coordinates for multiple camera positions are computed 812. This can include stretching the ideal imposter texture over the main imposter face and bridge segments 814. The resultant image can then be displayed 816.

Figure 9:
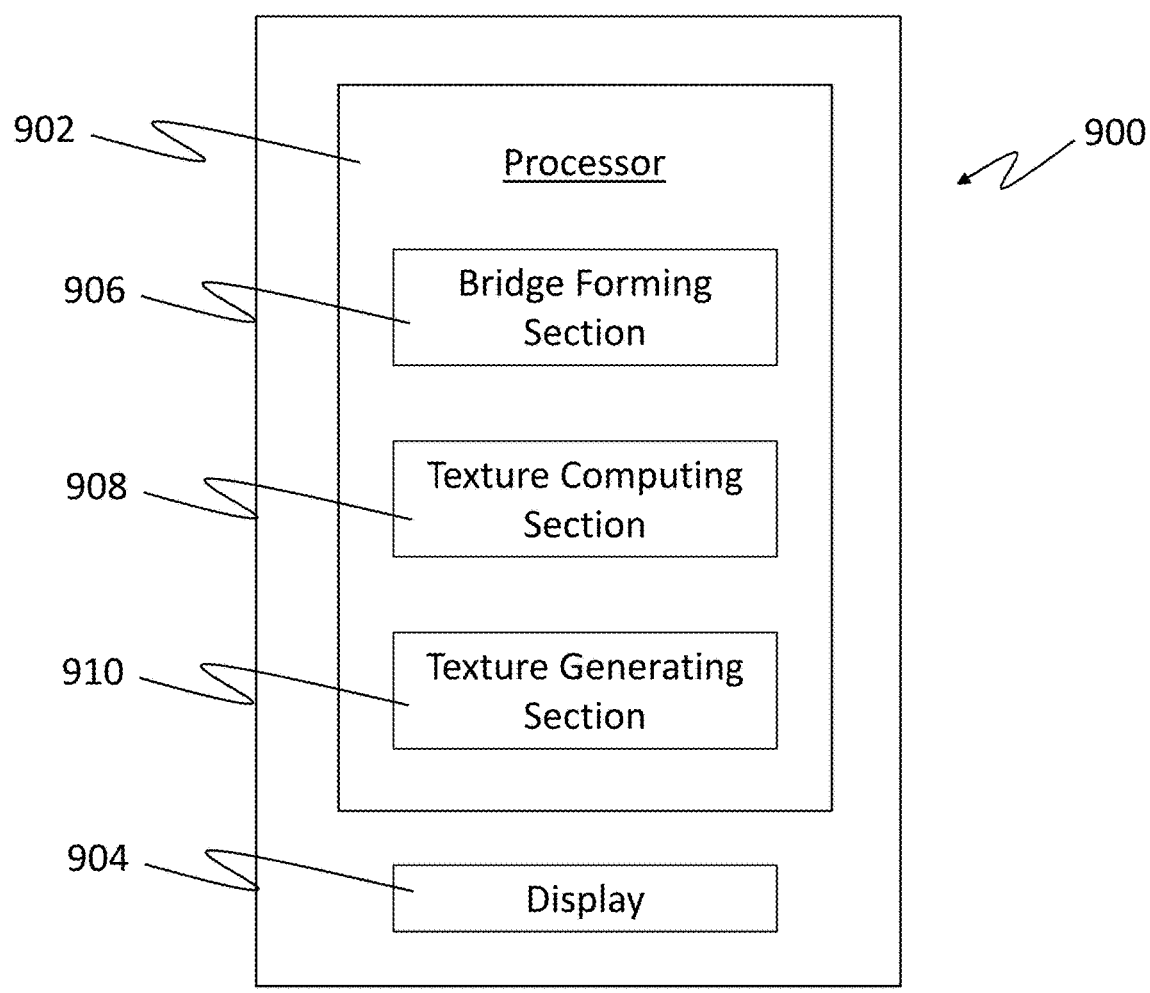
FIG. 9 illustrates an apparatus for generating an image.

Similarly, FIG. 9 illustrates an apparatus 900 for implementing the above-described aspects to generate an image. The system 900 has at least a processor (e.g., a CPU or GPU) 902 and a display 904. A bridge forming section 906 of the processor 902 executes the first aspect described herein, for example, forming a bridge between a sequence of points 800. As described above with respect to FIG. 8, the bridge may be formed according to steps 802-808. The second aspect, for example, generating textures and mapping the textures to the new surface geometry, may be performed by the texture generating section 910. The texture computing section 908 performs the third aspect described herein, for example, by computing texture coordinates for multiple camera positions and stretching the texture over the imposters as in steps 812 and 814 of FIG. 8. The resulting image generated by the processor 902 can be shown on display 904.

With the above-described aspects and combinations thereof can improve the functionality of both hardware on which they are implemented and technologies to which they are applied. For example, the above aspects may reduce the rendering resources required for displaying point cloud data (e.g., by 30 times). As noted above, the aspects described above may allow for real-time manipulation of point cloud data as it is rendered, thereby increasing efficiency and analysis of that data.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget. Finally, the term "substantially," if used herein, is a term of estimation.

While various features are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

The invention claimed is:

1. A method for generating images comprising:
   forming a bridge between a sequence of a plurality of points, each consecutive pair of the sequence of points being points along an interface between two adjacent sub-meshes replaced by image-based imposters, wherein the plurality of points have the same screen space position and different world space positions when projected into the plane of the imposter;
   generating content of textures to be mapped onto the image-based imposters; and
   computing texture coordinates for a generation position and a second camera position,
   wherein the step of computing texture coordinates for the second camera position comprises stretching the textures over the respective imposters, and
   wherein the textures are stretched based on a weighted metric such that as segments of the bridge corresponding to the imposters become visible the stretching of the textures increases.

2. The method according to claim 1, wherein the step of forming a bridge comprises:
   constructing an artificial interface of world space points along the natural interface between the two adjacent sub-meshes;
   projecting the world space points into screen space positions;
   reassigning the screen space positions depth coordinates of two destination imposter planes; and
   transforming the screen space positions back into world space.

3. The method according to claim 1, wherein the step of forming a bridge comprises constructing an artificial interface of world space points along the interface between the two adjacent sub-meshes, the artificial interface of world space points being constructed using a strip tree.

4. The method according claim 1, wherein the step of forming a bridge comprises constructing an artificial interface of world space points along the interface between the two adjacent sub-meshes, the artificial interface of world space points being constructed using a Bézier curve.

5. The method according to claim 1, wherein the step of forming a bridge comprises constructing an artificial interface of world space points along the interface between the two adjacent sub-meshes, the artificial interface of world space points being constructed using a basis spline.

6. The method according to claim 1, wherein the method is applied to a point cloud split into a plurality of meshes.

7. The method according to claim 1, wherein the two adjacent sub-meshes are stored in memory and the method is executed by a processor.

8. The method according to claim 1, further comprising displaying the generated image on a monitor.

9. The method according to claim 1, wherein the image is generated in real-time based on a dataset, as the dataset is being modified.

10. An apparatus for generating an image comprising:
    a bridge forming section configured to form a bridge between a sequence of a plurality of points, each consecutive pair of the sequence of points being points along an interface between two adjacent sub-meshes replaced by image-based imposters, wherein the plurality of points have the same screen space position and different world space positions when projected into the plane of the imposter;

a texture generating section configured to generate textures to be mapped onto the image-based imposters; and a texture computing section configured to compute texture coordinates for a generation position and a second camera position, wherein, for the second camera position, the texture computing section is further configured to stretch the textures over the respective imposters, and wherein the textures are stretched based on a weighted metric such that as segments of the bridge corresponding to the imposters become visible the stretching of the textures increases.

11. The apparatus according to claim 10, wherein the bridge forming section is further configured to:
construct an artificial interface of world space points along the natural interface between the two adjacent sub-meshes;
project the world space points into screen space positions;
reassign the screen space positions depth coordinates of two destination imposter planes; and
transform the screen space positions back into world space.

12. The apparatus according to claim 10, wherein the bridge forming section is further configured to construct an artificial interface of world space points along the interface between the two adjacent sub-meshes, the artificial interface of world space points being constructed using a strip tree.

13. The apparatus according to claim 10, wherein the bridge forming section is further configured to construct an artificial interface of world space points along the interface between the two adjacent sub-meshes, the artificial interface of world space points being constructed using a Bézier curve.

14. The apparatus according to claim 10, wherein the bridge forming section is further configured to construct an artificial interface of world space points along the interface between the two adjacent sub-meshes, the artificial interface of world space points being constructed using a basis spline.

15. The apparatus according to claim 10, further comprising a display for displaying the generated image.

16. The apparatus according to claim 10, wherein the image is generated in real-time based on a dataset, as the dataset is being modified.

* * * * *